United States Patent Office 2,693,319
Patented Nov. 2, 1954

2,693,319

PROCESS FOR IMPROVING THE BRIGHTNESS OF CLAY

Charles H. Schneider, Birmingham, Ala., assignor, by mesne assignments, to Minerals & Chemicals Corporation of America, Metuchen, N. J., a corporation of Maryland No Drawing. Application October 10, 1950,
Serial No. 189,490

3 Claims. (Cl. 241—21)

This invention relates to a process for improving the brightness of clay. It has to do with a process which comprises detaching from kaolinite iron bearing titanium mineral adhering to the kaolinite and segregating kaolinite relatively free from iron bearing itanium mineral. I effect the detaching of the iron bearing titanium mineral from the kaolinite by shearing.

Many efforts have been made to whiten or brighten clays found in the United States, such as Georgia clays, which contain discoloring matter in an effort to make them comparable in brightness with realtively costly imported clays. I have discovered that such clays can be brightened, in many cases to or exceeding the brightness of costly imported clays, by a process which comprises subjecting them to shear. By so doing I detach at least a portion of the discoloring matter which enables me to segregate relatively pure clay or kaolinite relatively free from discoloring matter.

My method is based on the fact that at least a considerable proportion of the discoloration in domestic clay comes from particles of iron bearing titanium mineral adhering to the kaolinite but which, I have discovered, can be detached from the kaolinite by shearing. While I do not wish to be bound by any theory, I believe that a large part of the discoloration in domestic clay, such, for example, as Georgia clay, comes about through the fact that particles of anatase stained with iron adhere to the kaolinite. Pure anatase is white but it is susceptible of discoloration by iron so that the anatase particles found in Georgia clay are a light brown or yellowish color. Clay containing such particles is substantially less bright than relatively pure imported clays. While I believe that at least the greater part of the discoloring matter found in Georgia clay is anatase some of it may be other iron bearing titanium minerals, as, for example, rutile or ilmenite. At any rate I believe that the clay is discolored by particles of iron bearing titanium mineral adhering to the kaolinite, which particles I find can be detached from the kaolinite by shearing.

I believe that the particles of iron bearing titanium mineral and kaolinite are in some way bonded together so that normally they do not separate. I have found that particles of iron bearing titanium mineral can be detached from kaolinite by subjecting the clay to shear whereafter kaolinite relatively free from iron bearing titanium mineral may be segregated. Such segregated kaolinite relatively free from iron bearing titanium mineral may have a brightness comparable or even superior to that of the relatively costly imported clays. This can be done without bleaching. However, I have found that when kaolinite relatively free from iron bearing titanium mineral is segregated by my process and then bleached the result is an unprecedented improvement in brightness.

I preferably suspend in a fluid medium mineral matter in a state of fine subdivision and comprising particles of kaolinite having particles of iron bearing titanium mineral adhering to the kaolinite and subject said mineral matter to shear while suspended in the fluid medium and thereby detach iron bearing titanium mineral from the kaolinite. I then prefably physically separate while in the fluid medium kaolinite relatively free from iron bearing titanium mineral, after which I segregate kaolinite relatively free from iron bearing titanium mineral. I thereafter preferably bleach the segregated kaolinite relatively free from iron bearing titanium mineral.

The fluid medium may be selected from a wide variety of fluid media. Many such media are used in mineral separation as well known to those skilled in the art. For example, I may employ as the fluid medium tetrabromethane which is a so called "heavy liquid" whose specific gravity is intermediate the specific gravity of kaolinite and the specific gravity of the iron bearing titanium mineral adhering to the kaolinite. The specific gravity of tetrabromethane is slightly under 3 while the specific gravity of kaolinite is about 2.5 and the specific gravity of the iron bearing titanium mineral adhering to the kaolinite is in the neighborhood of 3.5 or greater. When tetrabromethane or some other heavy medium whose specific gravity is intermediate the specific gravity of kaolinite and the specific gravity of the iron bearing titanium mineral adhering to the kaolinite is used, after the shearing step presently to be described the kaolinite tends to rise to the surface of the liquid while the iron bearing titanium mineral tends to sink to the bottom. This enables easy segregation of at least a substantial portion of the kaolinite from at least a substantial portion of the iron bearing titanium mineral. The physical separation of the kaolinite and the iron bearing titanium mineral while in the medium is in the illustration given brought about through differential specific gravity and may be hastened by centrifuging. The kaolinite relatively free from iron bearing titanium mineral may be skimmed or decanted from the surface of the medium and may be separated from the medium by filtration or otherwise.

It is ordinarily desirable to deflocculate the clay as defloccuulation disperses the clay and increases the efficiency of the shearing action. Any suitable deflocculating or surface active agent may be employed as well known to those skilled in the art. The agent will be selected to be compatible with the medium, such selection being purely a matter within the knowledge of those skilled in the art. For example, when tetrabromethane is used as the medium diethylene glycol ricinoleate may be employed as the deflocculating or surface active agent. The agent is added in very small quantity, generally a few drops per liter satisfactorily accomplishing the deflocculation of the kaolinite.

After the mineral matter in a state of fine subdivision and comprising particles of kaolinite having particles of iron bearing titanium mineral adhering to the kaolinite has been suspended in the fluid medium and, if desired, deflocculated, the mineral matter is subjected to shear in the fluid medium whereby to detach iron bearing titanium mineral from the kaolinite. The shearing may be effected in various ways. I have found that shearing by high frequency vibration is very satisfactory. The shearing may also be accomplished in a colloid mill or in certain cases by vigorous boiling. I have used with success an ultrasonic oscillator manufactured by Piezo Products Company which is of the piezoelectric type using interchangeable quartz crystals for various frequencies. I have used with success a frequency of 400 kilocycles per second. The crystal and its mount are immersed in oil contained in a vessel. The suspended mineral matter is disposed in a smaller vessel which is introduced into the first mentioned vessel so that the vibration from the crystal is transmitted through the oil and through the wall of the inner vessel to the suspended mineral matter. The shearing detaches iron bearing titanium mineral from the kaolinite. This is apparently effected by the shearing of the bond initially existing between the particles of iron bearing titanium mineral and the kaolinite.

After physically separating and segregating kaolinite relatively free from iron bearing titanium mineral such segregated kaolinite may be redispersed and the process repeated; or if the process is carried out as a multiple step operation the detaching and separating steps may be repeated any number of times before the segregating step. Two separating treatments are often enough to remove the visible iron bearing titanium mineral although three, four or more such treatments may be employed in particular instances. The segregated kaolinite relatively free from iron bearing titanium mineral may be washed, as with acetone and water, and dried. Acetone is a solvent for tetrabromethane; the acetone after dissolving the tetrabromethane may be washed out with water. The kaolinite may be bleached and may attain a brightness equal to or greater than the brightness of imported clays. The bleaching may be effected at a convenient stage, as after washing but before drying of segregated kaolinite relatively free from iron bearing titanium mineral.

I have made no effort to list great numbers of fluid media which may be used for suspending the mineral matter because very many media may be employed and the selection of a medium is within the knowledge of any person skilled in the art. Likewise I have not listed a large number of deflocculating or surface active agents since any person skilled in the art is capable of selecting an appropriate agent once the medium is known. The bleaching may be done in any suitable manner known to those skilled in the art.

While the physical separation above described is accomplished through differential density, it may be accomplished otherwise, as for example, by differential magnetic susceptibility, differential dielectric constant, preferential wettability, etc.

It is possible to use a liquid medium which is not a "heavy medium" and whose density is not intermediate the density of kaolinite and the density of the iron bearing titanium mineral adhering to the kaolinite in which case separation can be accomplished by differential settling or otherwise as known to those skilled in the art. For example, as disclosed in copending application Serial No. 189,489, now abandoned, filed of even date herewith, mineral matter in a state of fine subdivision and comprising particles of kaolinite having particles of iron bearing titanium mineral adhering to the kaolinite may be suspended in water and the kaolinite dispersed with ammonium hydroxide. After the shearing as hereinabove disclosed the particles of iron bearing titanium mineral agglomerate while the particles of kaolinite remain dispersed or deflocculated. This makes possible separation by differential settling or otherwise as suggested above.

While I have described certain present preferred methods of practicing the invention it is to be distinctly understood that the invention is not limited thereto but may be otherwise variously practiced within the scope of the following claims.

1. A process for improving the brightness of clay comprising suspending clay comprising particles respectively having adherent parts of kaolinite and iron bearing titanium mineral in a liquid medium which is inert and non-reactive with both the kaolinite and the iron bearing titanium mineral, subjecting the thus suspended particles to shearing action of such intensity and duration as to detach from each other the aforementioned parts of the respective particles and physically separating and segregating kaolinite relatively free from iron bearing titanium mineral, the separated and segregated kaolinite being substantially brighter than the starting clay.

2. A process for improving the brightness of clay comprising suspending clay comprising particles respectively having adherent parts of kaolinite and iron bearing titanium mineral in a liquid medium which is inert and non-reactive with both the kaolinite and the iron bearing titanium mineral, subjecting the thus suspended particles to shearing action by high frequency vibration of such intensity and duration as to detach from each other the aforementioned parts of the respective particles and physically separating and segregating kaolinite relatively free from iron bearing titanium mineral, the separated and segregated kaolinite being substantially brighter than the starting clay.

3. A process for improving the brightness of clay comprising suspending clay comprising particles respectively having adherent parts of kaolinite and iron bearing titanium mineral in a liquid medium which is inert and non-reactive with both the kaolinite and the iron bearing titanium mineral and whose density is intermediate the density of the kaolinite and the density of the iron bearing titanium mineral, subjecting the thus suspended particles to shearing action of such intensity and duration as to detach from each other the aforementioned parts of the respective particles, physically separating through differential density while in the liquid medium kaolinite relatively free from iron bearing titanium mineral and segregating kaolinite relatively free from iron bearing titanium mineral, the segregated kaolinite being substantially brighter than the starting clay.

References Cited in the file of this patent

UNITED STATES PATENTS

| Number | Name | Date |
|---|---|---|
| Re. 14,583 | Schwerin | Jan. 7, 1919 |
| 667,222 | Ivery | Feb. 5, 1901 |
| 1,233,713 | Schwerin | July 17, 1917 |
| 1,324,958 | Feldenheimer | Dec. 16, 1919 |
| 1,438,588 | Feldenheimer | Dec. 12, 1922 |
| 1,500,845 | Plauson | July 8, 1924 |
| 1,842,372 | Allison | Jan. 26, 1932 |
| 2,138,051 | Williams | Nov. 29, 1935 |
| 2,158,987 | Maloney | May 16, 1939 |
| 2,163,649 | Weaver | June 27, 1939 |
| 2,173,975 | Lyons | Sept. 26, 1939 |
| 2,225,797 | Plauson | Dec. 24, 1940 |
| 2,363,937 | Brandt et al. | Nov. 28, 1944 |

FOREIGN PATENTS

| Number | Country | Date |
|---|---|---|
| 184,880 | Great Britain | Aug. 21, 1922 |
| 521,883 | Great Britain | June 3, 1940 |

OTHER REFERENCES

"New Cleaning Process," by W. B. Foulke, Coal Age, May 1938, pp. 74–79. (Copy in Division 55.)

Colloidal Dispersions, by Fisher, 1950, pp. 266, 267 and pp. 338–347. (Copy in Division 25.)